Figure 3:
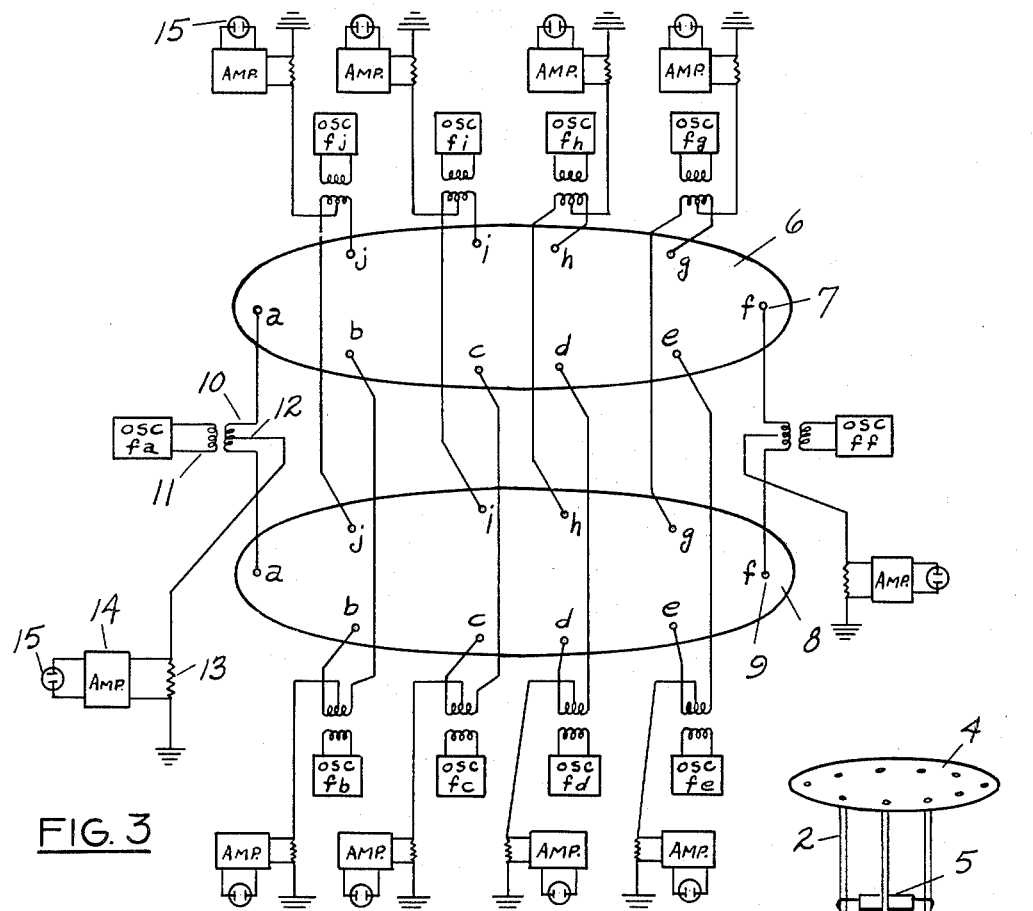

July 3, 1956    O. I. STEIGERWALT ET AL    2753,523
NETWORK TESTING EQUIPMENT
Filed March 7, 1955

INVENTORS
Oliver I. Steigerwalt
BY Howard I. Oshry
Ralph Hammar
Attorney

United States Patent Office 2,753,523
Patented July 3, 1956

2,753,523
NETWORK TESTING EQUIPMENT

Oliver I. Steigerwalt and Howard I. Oshry, Erie, Pa., assignors to Erie Resistor Corporation, Erie, Pa., a corporation of Pennsylvania Application March 7, 1955, Serial No. 492,371

5 Claims. (Cl. 324—73)

In multiple terminal networks where there may be circuit elements connected from any terminal to one or more of the other terminals, testing has heretofore required successive impedance measurements between each pair of terminals. This invention is intended to test such networks simultaneously by comparison with a standard. Each terminal of the standard is connected to a separate source of power having substantially zero cross-correlation and each terminal of the network is connected to a source of power of the same kind as that connected to the corresponding terminal of the standard. Because of the absence of cross-correlation between the sources of power, the current flow from each power source into the terminal of the standard and into the corresponding terminal on the network being tested is independent of the other sources of power. Accordingly, when the network being tested is identical with the standard, the current flow into any terminal of the standard and the corresponding terminal of the network will be equal. Conversely, when the difference between such currents exceeds a threshold value that indicates that the network is too different from the standard. Since this information is obtained simultaneously at each terminal of the network, the entire network can be simultaneously tested.

A simple analysis shows the conditions under which this method of testing a network yields a unique and unambiguous result. Consider the matrix equation describing the performance of an *n*-terminal linear, passive network $$I \cdot Z = E$$

where I is the matrix of terminal currents, Z the network impedance matrix and E the matrix of terminal voltages measured from ground or other reference. Then Z can uniquely be determined from measured I provided that the components of applied E are all different from zero and are either unalike in phase and magnitude or else are of different frequency.

The fact that deviations in the elements of Z between test and standard networks must be measured in order to distinguish tolerable deviations requires that applied components of matrix E be alike in magnitude and therefore, different in frequency. This choice insures current differences at any detector proportional to tolerance errors in elements connected between that terminal and to any other terminal.

It has been found that this principle of comparison can also be extended to non-linear networks, specifically those including germanium diodes. Thus, for one half-cycle of voltage the forward conduction currents of both diodes are summed in the detectors involved, and during the remaining half-cycle reverse conduction currents are summed. Providing that the forward and reverse resistances of the diodes are sufficiently close in value, an acceptable comparison is registered.

It should be pointed out that non-linear elements of other types such as "Thyrite" can also be compared so long as non-linearity in test and standard networks is arranged in complementary fashion as before explained. Also, the term complementary applies only to spacial configuration since standard and test networks so arranged display identical characteristics in time.

In a preferred form each of the separate power sources appear in a transformer secondary having one end connected to a terminal of the standard and the opposite end connected to the corresponding terminal of the network, so that the voltages at such terminals are of equal magnitude and opposite phase with reference to a grounded center tap on the transformer secondary. There will be no current in the grounded center tap when the network and standard are identical. Any current in the grounded center tap is due to differences between the network and standard and whenever that difference exceeds a threshold it is used to give a visual indication.

Figure 2:
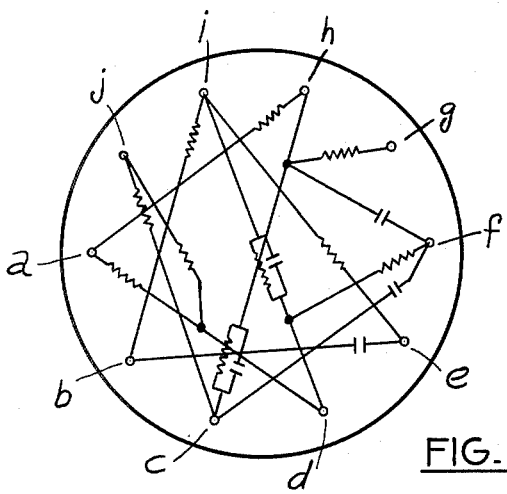
Figure 1:
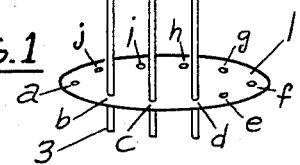
Figure 4:
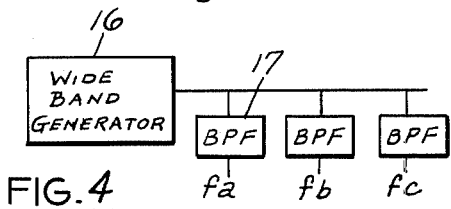

In the drawing, Fig. 1 is a fragmentary view of a multiple terminal network; Fig. 2 is a circuit diagram of the network; Fig. 3 is a circuit diagram of the testing equipment; and Fig. 4 is a diagram of an alternative arrangement for supplying non-correlated power to the test equipment.

In Fig. 1 of the drawing is shown part of a plug-in type network having a base 1 having a plurality of terminals *a* to *j*, inclusive, arranged in a circle around the outside thereof. Through each of the terminals extends a rod 2 having its lower end projecting through the base to provide a prong 3 and having its upper end extending through a header member 4 which serves to hold the upper ends of the rods 2 in fixed relation to each other. Between any two of the rods, a circuit component such as a resistor or condenser 5 may be connected as diagrammatically indicated in Fig. 1. The components may not be linear. For example, some or all of the components may be asymmetric conductors or non-linear resistances. Fig. 1 is, of course, greatly simplified since substantially all of the rods 2 have been removed and only one of the circuit elements 5 is shown.

Fig. 2 shows a circuit diagram for the Fig. 1 network from which it can be seen that any one of the network terminals *a* to *j*, inclusive, is or may be connected to one or more of the other terminals by resistor or condenser or other inter-connections. In some cases, there is a direct connection of a resistor or a condenser and in other cases there is a resistor and a condenser in parallel. Since the network is capable of wide variation, the details of the particular network illustrated in Fig. 2 will not be described. The Fig. 2 network, however, does indicate that testing to determine whether the network meets the proper specifications would involve a great many cross-measurements between the various terminals *a* to *j*, inclusive.

In order to avoid the drudgery and time of checking the network point by point, the network is compared with a standard which has the characteristics of a perfect network. In the Fig. 3 test equipment, there is a socket 6 into which the network to be tested can be plugged. This socket has a series of terminals 7 corresponding to the prongs 3 of the network and correspondingly lettered *a* to *j*, inclusive. The test equipment also has a socket 8 into which the perfect network or standard is plugged. In the Fig. 3 equipment where the voltage on the standard is of opposite sign with respect to the voltage on the network plugged into the socket 7, the standard will have any asymmetric conductors or rectifiers connected in reverse polarity. This is merely to insure that the standard from the point of view of the applied voltage appears the same as the test network or in other words that the standard will be complementary to the test network. The socket 8 has terminals 9 for receiving the prongs of the perfect or standard network and these are lettered correspondingly *a* to *j*, inclusive. Across each of the correspondingly lettered terminals 7 and 9 of the sockets 6 and 8 is connected a secondary 10 of a transformer having its primary 11 connected to a high frequency oscillator power supply of frequency correspondingly lettered. Each of the frequencies *fa* to *fj*, inclusive, is different from each other so that any currents flowing from the power supplies have no effect upon each other or, in other words, there is zero cross-correlation between the applied signal voltages and the currents resulting therefrom. This means that from the point of view of each power supply the other power supplies do not exist and accordingly even though all of the power supplies are simultaneously connected through the socket terminals 7 and 9, a to j, inclusive, the current flowing from each power supply will in no way be affected by the fact that the other power supplies are also at the same time connected to the network. Each of the transformer secondaries 10 has its center tap 12 connected to ground through a load resistor 13. Since the opposite ends of the secondary are 180° out of phase, the currents flowing into the correspondingly lettered terminals of the sockets 6 and 8 will likewise be 180° out of phase. Accordingly, the current flowing to ground through the resistors 13 will be equal to the difference between the currents flowing to the correspondingly lettered terminals of the network and of the standard. When the network and standard are identical, there is no current flowing through any of the resistors 13. As the network deviates from the standard there will be more or less current flowing through the resistors 13 and when this differential current reaches a threshold value in any one of the resistors 13, an amplifier 14 produces sufficient voltage to light a signal light 15 thereby indicating that at that particular terminal, the network has too great a deviation from the standard to be acceptable. In the particular network illustrated in Fig. 3 where there are ten terminals 8 on the network and standard there will be ten signal lights 15. When the network being tested is close enough to the standard so that the current flowing to ground at each of the terminals does not exceed the threshold value, all of the signal lights 15 will be out. Only at those terminals where the network deviates too far from the standard will the signal light 15 be lighted. This, accordingly, provides a very quick apparatus for simultaneously testing multiple terminal networks and tells the tester at which terminals the network being tested is off standard so that the location of the trouble is determined.

In the use of the testing equipment, the operator plugs into the socket 8 a standard or perfect network. The operator then plugs into the socket 6 the network to be tested and if the network is perfect, none of the signal lamps 15 will light up. If the network is off standard between any terminal pair, the lamps corresponding to that pair will light up thereby locating the source of trouble. When the operator removes the network from the socket 6, all of the lights 15 light up because then there is no current to oppose that flowing through the standard. As soon as a new network is plugged in, the lights 15 all go out if the network is within commercial limits. Accordingly, the operator knows between each testing operation that the equipment is in operation because the lights 15 all light up when each network is removed.

While the power sources connected to the primaries 11 of the transformers may very conveniently be separate oscillators, it is also possible to use a wide band noise generator 16 which feeds a plurality of band pass filters 17 so that frequency bands fa, fb, fc, etc., may be taken off. These frequency bands are substantially non-overlapping so that currents due to these frequency bands still flow in the network being tested as though the other bands of frequencies were not present. The band pass filter arrangement of Fig. 4 permits the use of a very large number of separate bands of frequencies without the need for having separate oscillators for each frequency. This may be important in applications where the networks have large numbers of terminals. Of course, the output from each band pass filter is the power supply connected to the transformer 11 in the Fig. 3 circuit.

What is claimed as new is:

1. Test equipment for multiple terminal electric networks comprising a first set of terminals for contacting corresponding terminals on a network to be tested, a second set of terminals for contacting corresponding terminals on a standard having the characteristics of a perfect network, a plurality of sources of power of frequency different from each other, and each connected to a different terminal of the first set and to the corresponding terminal of the second set, means responsive to the difference between the current flow from each source to the terminals in the first and second sets to which it is connected, and a signal device for each power source actuated whenever said difference exceeds a threshold value whereby whenever the network to be tested is connected to the first set of terminals and the standard is connected to the second set of terminals, the actuation of the signal indicates that the network is off standard limits at the particular terminal to which the corresponding power source is connected.

2. The equipment of claim 1 in which each power supply is connected to the corresponding terminals of the first and second sets by opposite ends of a transformer secondary and the difference current is obtained from a center tap on that secondary.

3. The equipment of claim 1 in which the plurality of power sources comprise a wide band noise generator means and a plurality of band pass filters each passing bands of frequencies different from each other.

4. Test equipment for multiple terminal electric networks comprising a first set of terminals for contacting corresponding terminals on a network to be tested, a second set of terminals for contacting corresponding terminals on a standard having the characteristics of a perfect network, a plurality of sources of power having substantially zero cross-correlation between each other, and each connected to a different terminal of the first set and to the corresponding terminal of the second set, whereby the current flow into any terminal of the first set and the corresponding terminal of the second set is independent of the presence of the other sources of power, means responsive to the difference between the current flow from each power source to the terminals in the first and second sets to which it is connected, and a signal device for each power source actuated whenever said difference exceeds a threshold value whereby whenever the network to be tested is connected to the first set of terminals and the standard is connected to the second set of terminals, the actuation of the signal indicates that the network is off standard limits at the particular terminal to which the corresponding power source is connected.

5. Test equipment for multiple terminal electric networks comprising a first set of terminals for contacting corresponding terminals on a network to be tested, a second set of terminals for contacting corresponding terminals on a standard having the characteristics of a perfect network, a plurality of sources of power of frequency different from each other, and each connected to a different terminal of the first set and to the corresponding terminal of the second set, means responsive to the difference between the current flow from each power source to the terminals in the first and second sets to which it is connected, and a signal lamp for each power source lighted whenever said difference exceeds a threshold value whereby the lamp is lighted when only the standard is connected to the second set of terminals and nothing is connected to the first set of terminals and the lamp goes out whenever a network within standard limits is connected to the first set of terminals.

References Cited in the file of this patent

UNITED STATES PATENTS

| | | |
|---|---|---|
| 2,479,051 | Sunstein | Aug. 16, 1949 |
| 2,611,811 | Yates | Sept. 23, 1952 |